(12) United States Patent
Fairbanks et al.

(10) Patent No.: US 6,969,981 B1
(45) Date of Patent: Nov. 29, 2005

(54) VOLTAGE REGULATOR POWER MANAGEMENT APPARATUS

(75) Inventors: John Patrick Fairbanks, Roseville, CA (US); Hidehiko Suzuki, Tokyo (JP)

(73) Assignee: National Semiconductor Corporation, Santa Clara, CA (US)

(*) Notice: Subject to any disclaimer, the term of this patent is extended or adjusted under 35 U.S.C. 154(b) by 206 days.

(21) Appl. No.: 10/658,678

(22) Filed: Sep. 9, 2003

(51) Int. Cl.$^7$ .................................... G05F 5/00

(52) U.S. Cl. ................. 323/299; 323/274; 323/275; 323/281; 323/284; 323/285

(58) Field of Search .................... 323/265, 274, 323/275, 281, 284, 285, 299, 303

(56) References Cited

U.S. PATENT DOCUMENTS

| | | | | |
|---|---|---|---|---|
| 5,414,341 A | * | 5/1995 | Brown ................. | 323/268 |
| 5,598,093 A | * | 1/1997 | Acatrinei ............. | 323/299 |
| 5,949,226 A | * | 9/1999 | Tanaka et al. ........ | 323/285 |
| 6,204,654 B1 | * | 3/2001 | Miranda et al. ...... | 323/316 |
| 6,512,353 B2 | * | 1/2003 | Sanzo et al. ......... | 323/284 |

OTHER PUBLICATIONS

"LM2612 400mA Sub-miniature, Programmable, Step-Down DC-DC Converter for Ultra Low-Voltage Circuits," *National Semiconductor Corporation*, May 2002 (19 pages).
"LM2623 Ratio Adaptive Gated Oscillator Based, DC DC Boost Converter-Low Vin, Low Ripple, General Purpose," *National Semiconductor Corporation*, Nov. 2002 (11 pages).

* cited by examiner

*Primary Examiner*—Jeffrey Sterrett
(74) *Attorney, Agent, or Firm*—Brett A. Hertzberg; Merchant & Gould PC

(57) ABSTRACT

Quiescent currents in a circuit that includes a regulator are reduced by disabling selected portions of the circuit. A window comparator is selected activated to evaluate the input voltage such that a first operating mode is activated when the input voltage is within a predetermined voltage range and a second operating mode is activated when the input voltage is outside of the predetermined voltage range. The battery voltage is used a reference signal when the first mode is selected such that a voltage reference circuit can be disabled to reduce power, while the voltage reference circuit is enabled when the second mode is selected. Another comparator circuit is periodically activated to compare the reference signal to the output voltage. The regulator is disabled after the output voltage exceeds a first level. The output voltage collapses below a second level associated, the evaluation and regulation process is repeated.

24 Claims, 4 Drawing Sheets

VOLTAGE REGULATOR POWER MANAGEMENT APPARATUS

FIELD OF THE INVENTION

The present invention is related to regulators such as shunt regulators and DC—DC converters that may be used in a battery charger system. More particularly, the present invention is related to a circuit that reduces the quiescent currents used by a regulator by disabling power to portions of the system between switching cycles.

BACKGROUND OF THE INVENTION

Demand for portable electronic devices is increasing each year. Example portable electronic devices include: laptop computers, personal data assistants (PDAs), cellular telephones, and electronic pagers. Portable electronic devices place high importance on total weight, size, and battery life for the devices.

Most portable electronic devices employ rechargeable batteries. Commonly used rechargeable batteries include Nickel-Cadmium (NiCad), Nickel-Metal-Hydride (NiMHi), Lithium-Ion (Li-Ion), and Lithium-Polymer based technologies. Charger circuits are commonly available for each of these types of battery technologies. Each charger circuit often includes a shunt regulator to control the amount of charge that is delivered to the battery.

An example shunt regulator charging system is shown in FIG. 3. As shown in FIG. 3, the shunt regulator charging system (300) includes a power source (301), a shunt regulator (302), and a load circuit (303). The power source (301) includes a voltage source (VS) and a source resistance (RS). The shunt regulator (302) includes a NMOS transistor (MN), a PMOS transistor (MP), two amplifiers (AMP1, AMP2), three resistors (R31–R33), and a switch control circuit (SCON). The load circuit (303) includes a rechargeable battery (BATT).

In operation the power source provides a charging current ($I_{CHG}$) to the rechargeable battery through source resistance RS, PMOS transistor MP, and resistor R33. Resistor R33 converts the charging current ($I_{CHG}$) into a voltage ($V_{SNS}$), which is used by amplifier AMP2 and switch control circuit SCON to control the activation of transistor MP. PMOS transistor MP is activated during normal charging operations. Resistors R31 and R32 form a voltage divider that provides a feedback signal (VFB) to amplifier AMP1. Amplifier AMP1 compares the feedback signal (VFB) to a reference voltage (VREF) and provides a control signal (SHCON) to transistor MN. Transistor MN, amplifier AMP1, and resistors R31–R32 together operate as a shunt regulator that regulates the input voltage (VIN). The shunt regulator provides safe charging of rechargeable battery BATT by limiting the charging voltage (input voltage) similar to a zener diode.

Many portable power applications use a DC—DC converter to either step up or down the battery voltage for use with particular circuits. For example, video display circuits typically require an operating voltage that exceeds the battery voltage. In a DC—DC converter, the output voltage is provided to a load circuit by varying the conduction time that is associated with a controlled device. Example controlled devices include transistors, gate-turn-on (GTO devices), thyristors, diodes, as well as others. The frequency, duty cycle, and conduction time of the controlled device is varied to adjust the average output voltage to the load. Typical DC—DC converters are operated with some sort of oscillator circuit that provides a clock signal. The output voltage of the converter is also determined by the oscillation frequency associated with the clock signal.

BRIEF DESCRIPTION OF THE DRAWINGS

Non-limiting and non-exhaustive embodiments of the present invention are described with reference to the following drawings.

DETAILED DESCRIPTION OF THE PREFERRED EMBODIMENT

Figure 1:
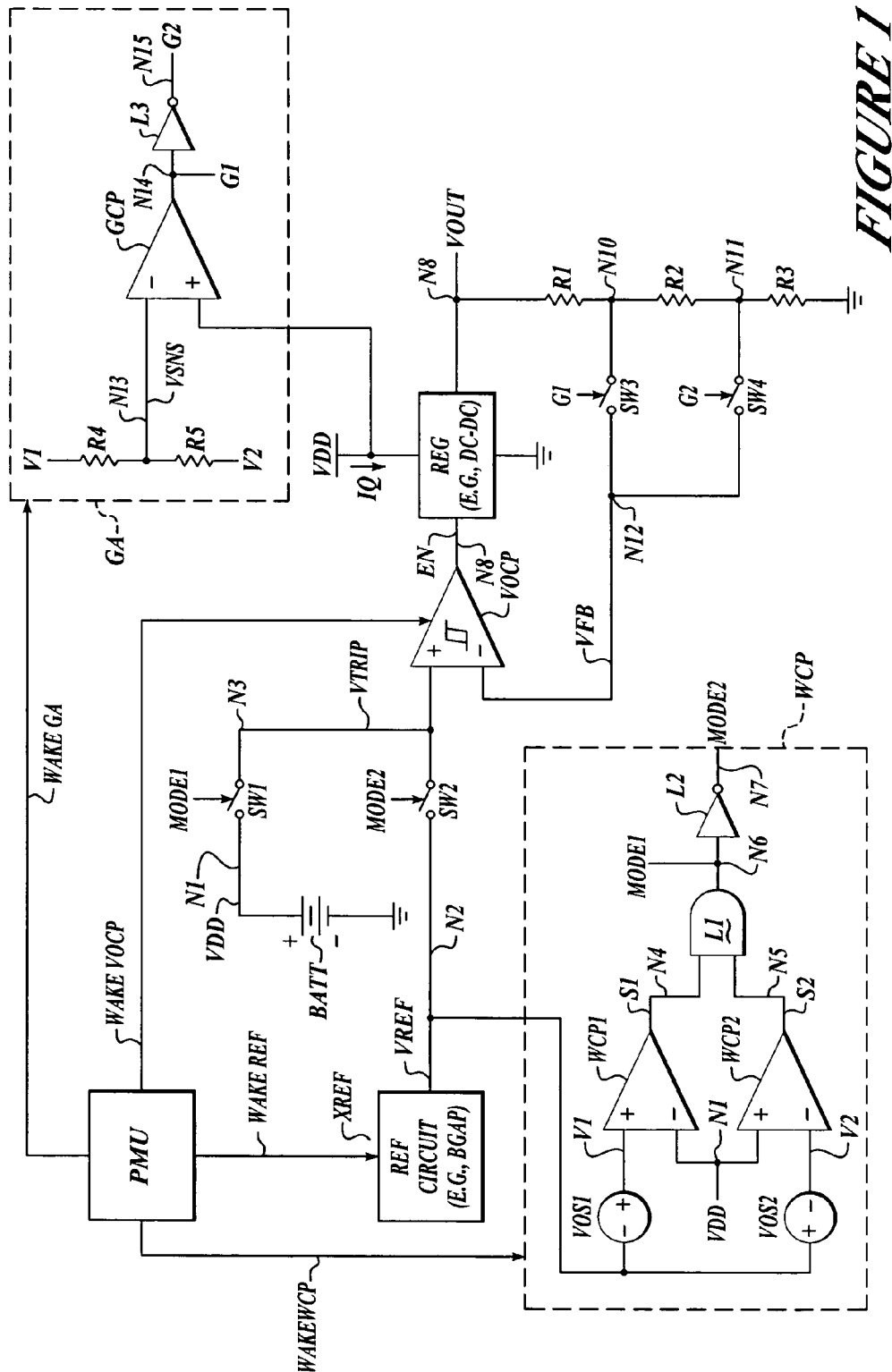
FIG. 1 is an illustration of a schematic diagram for a circuit that is arranged to selectively disable circuits to conserve power according to an embodiment of the present invention.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meaning of "a," "an," and "the" includes plural reference. The meaning of "in" includes "in" and "on." The term "connected" means a direct connection between the items connected, without any intermediate devices. The term "coupled" refers to both direct connections between the items connected, and indirect connections through one or more intermediary items. The term "circuit" may refer to both single components, and to a multiplicity of components. The term component refers to one or more items that are configured to provide a desired function. The term "signal" includes signals such as currents, voltages, charges, logic signals, data signals, optical signals, electromagnetic waves, as well as others. Referring to the drawings, like numbers indicate like parts throughout the views.

Briefly stated, quiescent currents in a circuit that includes a regulator are reduced by disabling selected portions of the circuit. A window comparator is selected and activated to evaluate the input voltage such that a first operating mode is activated when the input voltage is within a predetermined voltage range and a second operating mode is activated when the input voltage is outside of the predetermined voltage range. The battery voltage is used a reference signal when the first mode is selected such that a voltage reference circuit can be disabled to reduce power, while the voltage reference circuit is enabled when the second mode is selected. Another comparator circuit is periodically activated to compare the reference signal to the output voltage. The regulator is disabled after the output voltage exceeds a first level. The output voltage collapses below a second level associated, the evaluation and regulation process is repeated.

FIG. 1 is an illustration of a schematic diagram for a circuit that is arranged to selectively disable circuits to conserve power according to an embodiment of the present invention. The circuit included a power management unit (PMU), a reference circuit (XRFEF), a regulator circuit (REG), three resistors (R1–R3), four switch circuits (SW1–SW4), a comparator (VOCP), a window comparator (WCP), and a gain adjustment circuit (GA).

A power source such as a battery (BATT) is coupled between node N1 and a circuit ground, and arranged to provide an input voltage (VDD). Switch circuit SW1 is coupled between nodes N1 and N3, and responsive to signal MODE1. Switch circuit SW2 is coupled between nodes N2 and N3, and responsive to signal MODE2. Comparator VOCP includes a non-inverting input that is coupled to node N3, an inverting input that is coupled to node N12, an output that is coupled to node N8, and is selectively enabled in response to signal WAKEVOCP. Reference circuit XREF is selectively enabled in response to signal WAKEREF, and provides a reference voltage (VREF) at node N2 when enabled. Regulator circuit REG has an enable terminal (EN) that is coupled to node N8, an output terminal that is coupled to node N9, and has a quiescent operating current corresponding to IQ. Resistor R1 is coupled between nodes N9 and N10. Resistor R2 is coupled between nodes N10 and N11. Resistor R3 is coupled between node N11 and ground. Switch circuit SW3 is coupled between nodes N10 and N12, and responsive to signal G1. Switch circuit SW4 is coupled between nodes N11 and N12, and responsive to signal G2. Window comparator circuit WCP includes an input that is coupled to node N2, another input that is coupled to node N1, an output (MODE1) that is coupled to node N6, another output (MODE2) that is coupled to node N7, and is enabled in response to signal WAKEWCP. Gain adjustment circuit GA includes a first input that is coupled to node N1, a second input that is arranged to receive signal V1, a third input that is arranged receive signal V2, an output that is coupled to node N14, another output that is coupled to node N15, and is enabled in response to signal WAKEGA. The PMU is arranged to provide the signals WAKECP, WAKEREF, WAKEVOCP, and WAKEGA.

In one example embodiment, the window comparator (WCP) includes two comparators (WCP1, WCP2), two logic circuits (L1, L2), and two offset circuits (VOS1, VOS2). Comparator WCP1 includes a non-inverting input that receives signal V1, an inverting input that is coupled to node N1, and an output that is coupled to node N4. Comparator WCP2 includes an inverting input that receives signal V2, a non-inverting input that is coupled to node N1, and an output that is coupled to node N5. Offset circuit VOS1 is coupled to node N2 and arranged to provide signal V1. Offset circuit VOS2 is coupled to node N2 and arranged to provide signal V2. Logic circuit L1 is represented as an AND gate with inputs from nodes N4 and N5, and an output at node N6. Logic circuit L2 is represented as an inverter that has an input at node N6 and an output at node N7.

The window comparator circuit (WCP) illustrated in FIG. 1 is representative of one example circuit. In another example, offset circuit VOS1 may be built in to comparator WCP1. In yet another example, offset circuit VOS2 may be built in to comparator WCP2. In still another example, logic circuits L1 and L2 may be combined into one or more logic circuits.

In another example embodiment, the gain adjustment circuit (GA) includes a comparator (GCP), a logic circuit (L3), and a voltage divider that is represented as resistors R4 and R5. Comparator GCP includes a non-inverting input that receives VDD, an inverting input that is coupled to node N13, and an output that is coupled to node N14. Logic circuit L3 is represented as an inverter gate with an input from node N14, and an output at node N15. Resistor R4 is coupled between signal V1 and node N13. Resistor R5 is coupled between node N13 and signal V2.

Figure 3:
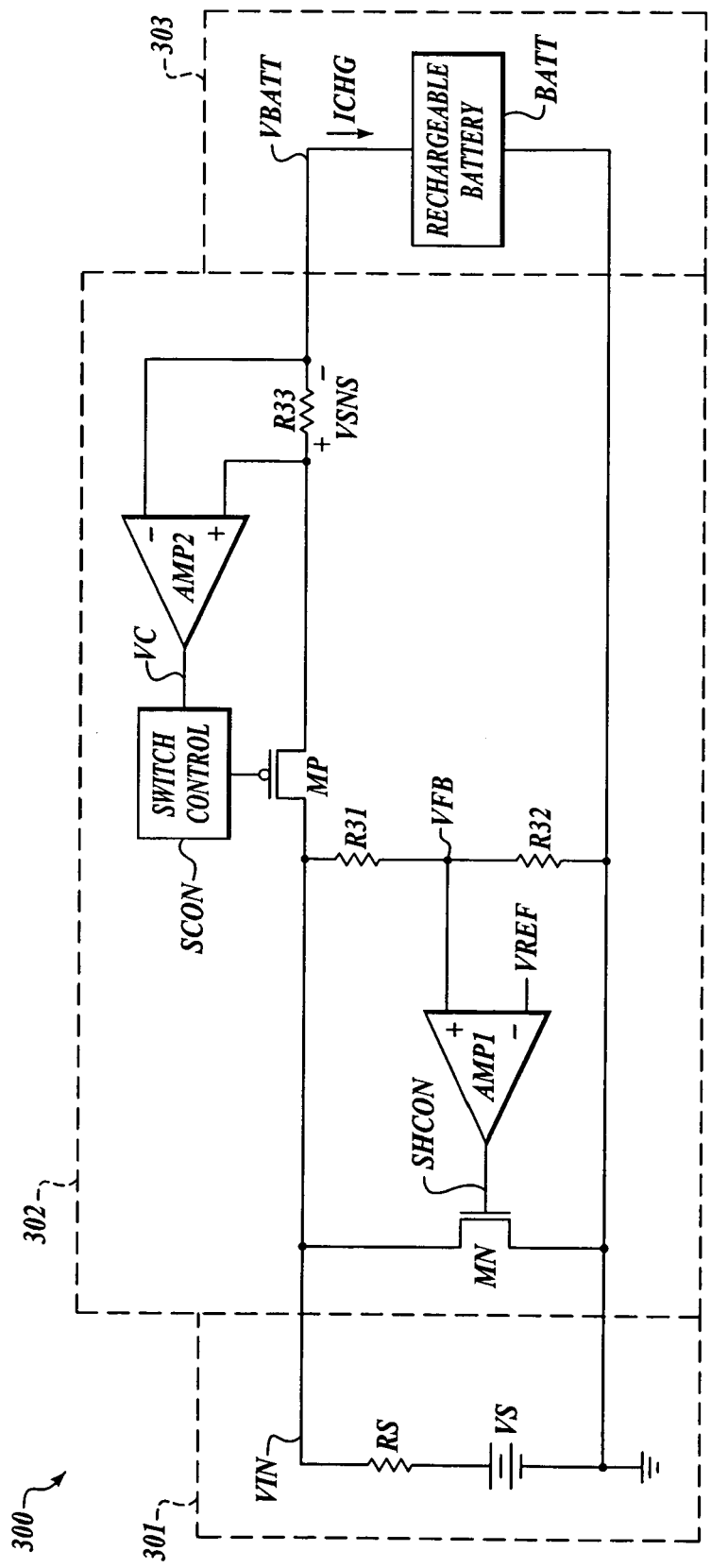
FIG. 3 is an illustration of a schematic diagram for a conventional shunt regulator that is arranged in a battery charger application.

In operation, the PMU is arranged to periodically activate portions of the circuit with signals WAKEWCP, WAKEREF, WAKEVOCP, and WAKEGA. The PMU may be operated in multiple modes including a low power mode, a full power mode, and a charging mode such as for charging a battery. The low power mode may be employed when the circuit is operated from a battery. The full power mode may be employed when the circuit detects an external power source. The charging mode may be employed when the battery is detected as being charged such as by a shunt regulator illustrated in FIG. 3. Additional modes may be utilized such as a sleep mode, a wakeup mode, and a deep sleep mode.

The circuit illustrated in FIG. 1 is arranged to evaluate the input voltage (VDD) using the window comparator (WCP) and determine when the input voltage is in a predetermined range of voltages. A first mode (MODE1) is activated when the input voltage (VDD) is within the predetermined range (e.g., 1.2V<VDD<1.3V), while a second mode (MODE2) is activated when the input voltage (VDD) is outside of the predetermined range (e.g., VDD<1.2V or VDD>1.3V). When the first mode (MODE1) is active, the input voltage is coupled to the non-inverting input of comparator VOCP. When the second mode (MODE2) is active, the reference voltage (VREF) is coupled to the non-inverting input of comparator VOCP. A feedback circuit (e.g., resistors R1–R3, switch circuits SW3–SW4) is arranged to monitor the output voltage (VOUT) and provide a feedback voltage (VFB) at node N12. Comparator VOCP is arranged to compare a trip voltage (VTRIP) from node N3 to the feedback voltage at node N12. The output of comparator VOCP is arranged to selectively enable the regulator (XREG).

The feedback circuit includes a gain selection circuit that is illustrated by switch circuits SW3 and SW4. The gain is adjusted by changing the selected tap point from the resistors divider formed by resistors R1, R2 and R3. For example, the tap point corresponding to node N10 is coupled to node N12 via switch circuit SW3 when signal G1 is asserted, while the tap point corresponding to node N11 is coupled to node N12 via switch circuit SW4 when signal G2 is asserted. Resistors R4 and R5 are arranged to operate as an example voltage divider that provides a sense signal (VSNS) at node N13 in response to signals V1 and V2. Comparator GCP compares sense signal VSNS to VDD to control the gain settings for the feedback circuit via signals G1 and G2. Gain signal G1 is asserted to select low gain when VDD is greater than VSNS, while gain signal G2 is asserted to select high gain when VDD is less than VSNS.

The feedback circuit and the gain adjustment circuit can be modified to accommodate any number of gain settings for precise regulation. For example, a third tap point can be added via an additional resistor (e.g., R6) and an additional switch circuit (e.g., SW5) in the feedback circuit. For this example, the gain adjustment circuit (GA) may require an additional comparator (e.g., GCP2) and additional decoding logic (e.g., L4) to provide an additional gain adjustment signal (e.g., G3). The voltage divider in the gain adjustment block may be implemented with resistors, capacitors, or any other appropriate circuit that is arranged to scale the sense voltage relative to V1 and V2.

By selectively enabling and disabling the regulator circuit (REG) and other non-essential electronics, the overall power consumption of the circuit is reduced. The PMU will periodically wake up various circuits to re-evaluate the output voltage and the input supply voltage (VDD). When the output voltage (VOUT) drops below the minimum permissible voltage, the regulator circuit (REG) is enabled and the output voltage increases up to the appropriate level. After the output voltage has settled, the supply voltage (VDD) is evaluated to determine if it is in the appropriate range. In one operating mode (MODE1) the input voltage is used as a reference signal instead of the reference circuit so that the current consumed by the reference circuit is eliminated. In another operating mode (MODE2), the reference voltage (VREF) is used as a reference signal (VTRIP). The regulator circuit is disabled to conserve current after the appropriate output voltage is achieved. The regulator circuit is re-enabled when the output voltage drops sufficiently low.

Figure 2A:
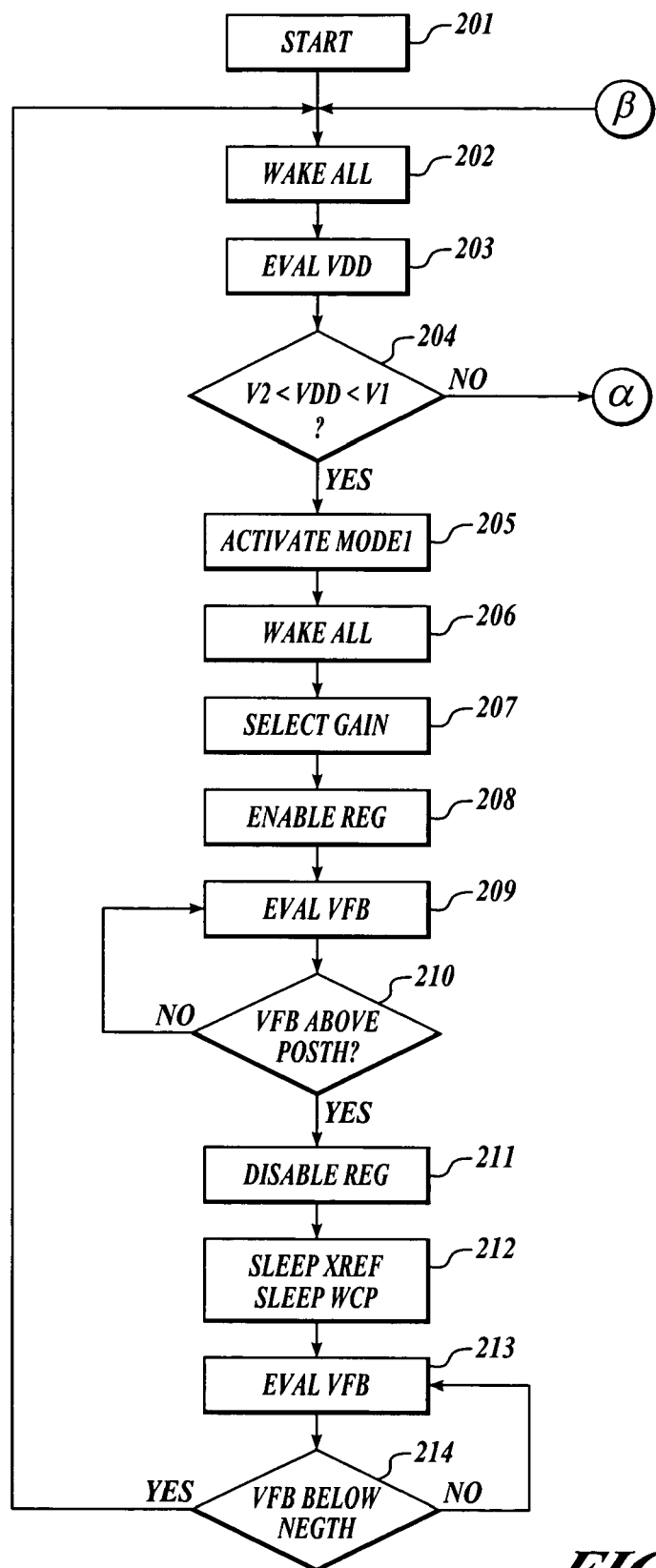
FIGS. 2A and 2B are illustrations of a flow chart for a circuit that is arranged to selectively disable circuits to conserve power according to another embodiment of the present invention.
Figure 2B:
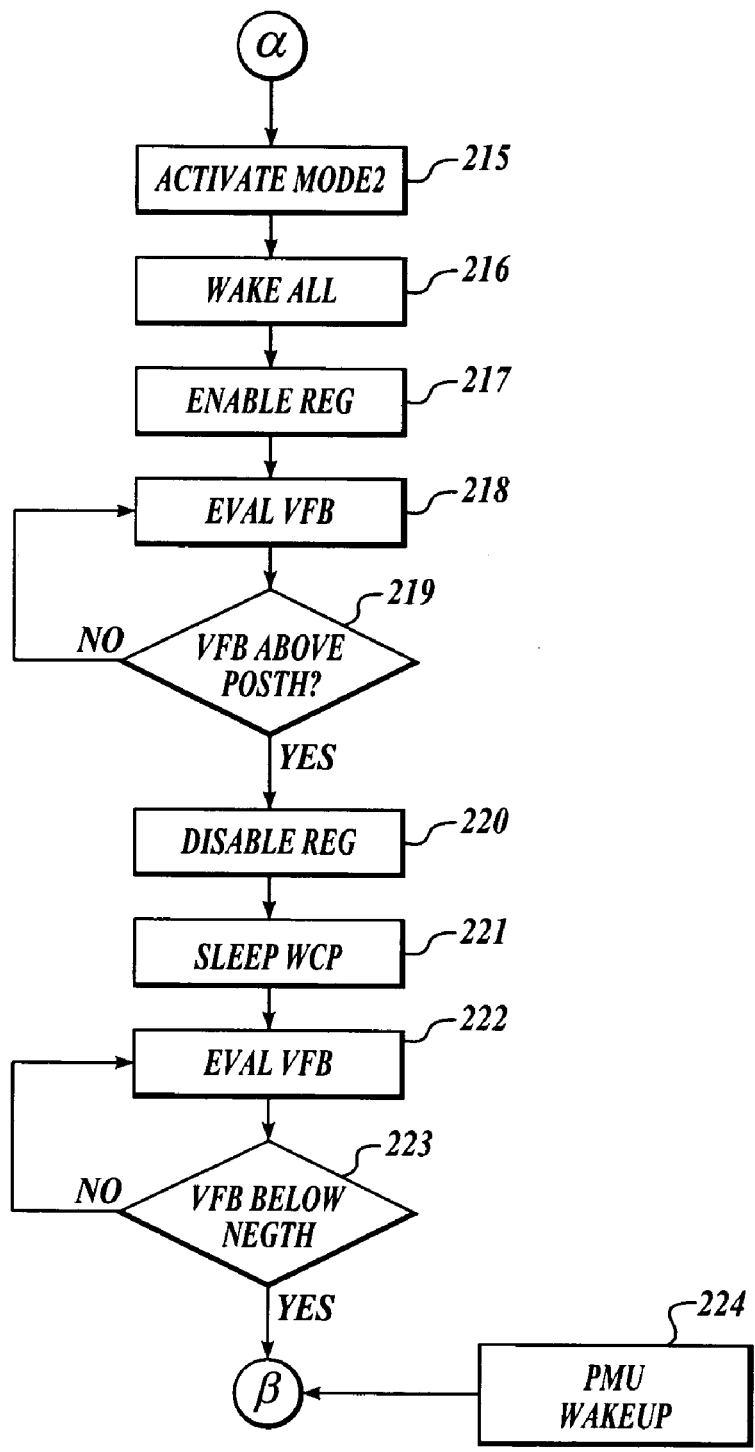

FIGS. 2A and 2B are an illustration of a flow chart for a circuit that is arranged in accordance with an embodiment of the present invention. Processing begins at START block 201 and proceeds to block 202. At block 202, all of the evaluation circuits are enabled via signals WAKEWCP, WAKEREF, and WAKEVOCP. At block 203, the input supply (VDD) is evaluated via the window comparator (WCP). Processing continues from decision block 204 to block 205 when the input supply (VDD) is in the predetermined range (e.g., V2<VDD<V1). Alternatively, processing continues from decision block 204 to block 215 when the input supply (VDD) is outside of the predetermined range (e.g., VDD>V1 or VDD<V2).

At block 205, the first mode (MODE1) is activated. Continuing to block 206, signals WAKEWCP, WAKEREF, and WAKEVOCP are asserted to enable various circuit to evaluate VDD and VOUT. Proceeding to block 207, the gain setting (e.g., either G1 or G2) is selected based on the input voltage (VDD). At block 208, the regulator circuit (REG) is enabled such that the output voltage is adjustable. From blocks 209 through 210, the feedback voltage (VFB) is evaluated and compared repeatedly to VTRIP. Processing continues to block 211, where the regulator circuit (REG) is disabled after the feedback voltage (VFB) exceeds a positive threshold (POSTH) associated with comparator VOCP.

Continuing from block 212, the PMU disables the reference circuit and the window comparator (WCP) by de-asserting signals WAKEREF and WAKEWCP. From blocks 213 through 214, the feedback voltage (VFB) is evaluated and compared repeatedly to VTRIP. Processing continues to block 202 after the feedback voltage (VFB) drops below a negative threshold (NEGTH) associated with comparator VOCP.

At block 215, the second mode (MODE2) is activated. Continuing to block 216, signals WAKEWCP, WAKEREF, and WAKEVOCP are asserted to enable various circuits to evaluate VDD and VOUT. Proceeding to block 217, the regulator circuit (REG) is enabled such that the output voltage is adjustable. From blocks 218 through 219, the feedback voltage (VFB) is evaluated and compared repeatedly to VTRIP. Processing continues to block 220, where the regulator circuit (REG) is disabled after the feedback voltage (VFB) exceeds a positive threshold (POSTH) associated with comparator VOCP.

Continuing from block 221, the PMU disables the window comparator (WCP) by de-asserting signal WAKEWCP. From blocks 222 through 223, the feedback voltage (VFB) is evaluated and compared repeatedly to VTRIP. Processing continues to block 202 after the feedback voltage (VFB) drops below the negative threshold (NEGTH) associated with comparator VOCP.

In one example embodiment, the positive and negative thresholds (POSTH, NEGTH) associated with comparator VOCP are approximately the same as one another. In another example, the positive and negative thresholds associated with comparator VOCP are different from one another such as when comparator VOCP includes hysteresis. The trip point associated with a substantially increasing signal is different from the trip point associated with a substantially decreasing signal in a comparator with hysteresis. The hysteresis characteristic can provide enhanced noise immunity in the overall circuit.

The above described circuit and procedural flow chart illustrates an example embodiment for disabling circuits between regulation cycles. The regulation cycle can be controlled by a power management unit that periodically "wakes up" selected circuits. For example, the window comparator (WCP) is periodically activated to evaluate the input voltage and select a reference level for the output comparator (VOCP). The reference level is selected from a reference circuit when the input voltage is outside of a desired range of voltages. The input voltage (or a percentage thereof) is selected as the reference level when the input voltage is in the desired range such that the reference circuit can be disabled to conserve power. After the window comparator (WCP) selects the appropriate reference level, the window comparator can be disabled to conserve power. An output comparator (VOCP) is arranged to compare the output voltage to the reference level to selectively activate the regulator to achieve a satisfactory voltage. Power is further conserved by operating a single comparator (VOCP) between switching cycles of the regulator.

The PMU may periodically "wake-up" the entire circuit as illustrated by block 224. The wake-up can be implemented as an interrupt that terminates all processing loops and initiates processing starting at block 202.

The gain adjustment circuit is arranged to evaluate VDD to determine an appropriate gain setting for the feedback circuit. For the example circuit illustrated in FIG. 1, gain setting G1 is selected when VDD is higher than VSNS (e.g., when VDD is between V1 and V2), and gain setting G2 is selected when VDD is lower than VSNS (e.g., when VDD is less than V2). The gain between the output voltage (VOUT) and the feedback voltage (VFB) is adjusted to compensate for changes in VDD. As described previously, additional gain adjustments can be implemented to increase the granularity of regulation in the output voltage.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus that is arranged to conserve power in a circuit that includes a regulator that provides an output voltage from an input voltage, the apparatus comprising:

a window comparator that is selectively enabled in response to a first control signal, wherein the window comparator is arranged to select a reference mode when enabled, wherein the reference mode corresponds to a first mode when the input voltage is within a predetermined range and a second mode when the input voltage is outside of the predetermined range;

a reference circuit that is selectively enabled in response to a second control signal, wherein the reference circuit is arranged to provide a reference voltage when enabled;

an output comparator that is selectively enabled in response to a third control signal, wherein the output comparator is arranged to selectively activate the regulator by evaluating a reference signal and the output voltage when enabled;
a switching circuit that is arranged to select the reference signal based on the reference mode such that the reference signal is associated with the input voltage in the first mode and the reference signal is associated with the reference voltage in the second mode; and
a power management unit that is arranged to provide the first control signal, the second control signal, and the third control signal such that the reference circuit and the window comparator are enabled to evaluate the input voltage, the reference circuit is disabled when the first mode is selected, and the output comparator is enabled between switching cycles of the regulator.

2. The apparatus of claim 1, wherein the window comparator and the power management unit are further arranged in cooperation such that the window comparator is disabled via the first control signal after the input voltage is evaluated, and wherein the window comparator is re-enabled via the first control signal such that the input voltage is periodically evaluated.

3. The apparatus of claim 1, wherein the window comparator is arranged to monitor at least one of the output voltage and the input voltage such that the output of the window comparator is capable of retriggering switching and calibration cycles in the apparatus.

4. The apparatus of claim 1, wherein the window comparator includes a first comparator circuit that is arranged to assert a first comparison signal when the input voltage is below a first predetermined level, a second comparator circuit that is arranged to assert a second comparison signal when the input voltage is above a second predetermined level, and a logic circuit that is arranged to select the reference mode in response to the first comparison signal and the second comparison signal.

5. The apparatus of claim 4, wherein the first comparator circuit includes a first offset circuit that is arranged to provide the first predetermined level in response to the reference voltage from the reference circuit.

6. The apparatus of claim 4, wherein the second comparator circuit includes a second offset circuit that is arranged to provide the second predetermined level in response to the reference voltage from the reference circuit.

7. The apparatus of claim 4, wherein the first comparator circuit includes a first offset circuit that is arranged to provide the first predetermined level in response to the reference voltage from the reference circuit, and wherein the second comparator circuit includes a second offset circuit that is arranged to provide the second predetermined level in response to the reference voltage from the reference circuit.

8. The apparatus of claim 1, wherein the reference circuit is a band-gap reference circuit.

9. The apparatus of claim 1, further comprising a feedback circuit, wherein the feedback circuit is arranged to provide a scaled version of the output voltage as a feedback voltage to the output comparator such that the output comparator is arranged to compare the feedback voltage to the reference signal.

10. The apparatus of claim 9, wherein the feedback circuit comprises a voltage divider circuit.

11. The apparatus of claim 9, wherein the feedback circuit comprises a voltage divider circuit and another switching circuit, wherein the another switching circuit is arranged to select a tap point from the voltage divider circuit based on a gain adjustment signal.

12. The apparatus of claim 11, further comprising a gain adjustment circuit, wherein the gain adjustment circuit comprises a gain comparator circuit that is arranged to evaluate the input voltage to provide the gain adjustment signal.

13. The apparatus of claim 1, wherein the output comparator includes hysteresis such that positive and negative thresholds associated with the output comparator are different from one another.

14. The apparatus of claim 1, wherein the switching circuit includes a first switch circuit and a second switch circuit, wherein the first switch circuit is arranged to couple the input voltage to the output comparator as the reference signal when the first mode is selected, and wherein the second switch circuit is arranged to couple the reference voltage to the output comparator as the reference signal when the second mode is selected.

15. The apparatus of claim 1, further comprising a voltage scaling circuit that is arranged to provide the reference signal as a scaled percentage of the input voltage when the first mode is selected.

16. An apparatus that is arranged to conserve power in a circuit that includes a regulator that provides an output voltage from an input voltage, the apparatus comprising:
an input comparison means that is arranged to select a reference mode when enabled, wherein the reference mode corresponds to a first mode when the input voltage is within a predetermined range and a second mode when the input voltage is outside of the predetermined range;
a reference voltage means that is arranged to provide a reference voltage when enabled;
an output comparison means that is arranged to selectively activate the regulator by evaluating a reference signal and the output voltage when enabled;
a switching means that is arranged to select the reference signal based on the reference mode such that the reference signal is associated with the input voltage in the first mode and the reference signal is associated with the reference voltage in the second mode; and
a power management means that is arranged to: enable the input comparison means and the reference voltage means to evaluate the input voltage, disable the reference voltage means when reference mode corresponds to the first mode, and enable the output comparison means between switching cycles of the regulator.

17. An apparatus as in claim 16, further comprising: a feedback means and a gain adjustment, wherein the feedback means is arranged to provide a sense signal that is related to the output voltage by a selected scaling factor, and wherein the gain adjustment means is arranged to vary the selected scaling factor in response to the input voltage.

18. A method of conserving power in a circuit that includes a regulator, wherein the regulator provides an output voltage from an input voltage, the method comprising:
initiating a quiescent current reduction cycle by:
activating a window comparator and a reference voltage circuit to evaluate the input voltage, wherein the reference voltage circuit is arranged to provide a reference voltage when activated;
selecting a first mode when the input voltage is within a voltage range that is associated with the reference voltage;

selecting a second mode when the input voltage is outside of the voltage range that is associated with the reference voltage;

processing the first mode by:
- deactivating the voltage reference;
- activating an output comparator;
- sensing the output voltage;
- enabling the regulator while the sensed output voltage is below a positive threshold that is associated with the output comparator, wherein the positive threshold is related to the input voltage;
- disabling the regulator after the desired sensed output voltage is achieved; and processing the second mode by:
- activating the output comparator;
- sensing the output voltage;
- enabling the regulator while the sensed output voltage is below a positive threshold that is associated with the output comparator, wherein the positive threshold is related to the reference voltage; and
- disabling the regulator after the desired sensed output voltage is achieved.

19. The method of claim 18, wherein processing the first mode further comprises: sensing the output voltage with a feedback circuit that includes a voltage divider.

20. The method of claim 18, wherein processing the first mode further comprises: monitoring the output voltage with the output comparator after the regulator is disabled, and initiating the quiescent current reduction cycle when the sensed output voltage is below a negative threshold that is associated with the output comparator.

21. The method of claim 18, wherein processing the first mode further comprises: selecting a gain factor that is associated with the sensed output voltage such that the output voltage is related to the sensed voltage according to the gain factor.

22. The method of claim 18, wherein processing the first mode further comprises: sensing the input voltage and selecting a gain factor such that the selected gain factor is responsive to the sensed input voltage, wherein the input voltage is related to the sensed voltage according to the gain factor.

23. The method of claim 18, wherein processing the second mode further comprises: sensing the output voltage with a feedback circuit that includes a voltage divider.

24. The method of claim 18, wherein processing the second mode further comprises: monitoring the output voltage with the output comparator after the regulator is disabled, and initiating the quiescent current reduction cycle when the sensed output voltage is below a negative threshold that is associated with the output comparator.

* * * * *